3,438,829
PROCESS FOR PREPARING BREATHABLE
FABRIC LAMINATES
Beresford Coe, Riverton, N.J., assignor to Rohm & Haas
Company, Philadelphia, Pa., a corporation of Delaware
No Drawing. Filed June 28, 1966, Ser. No. 561,059
Int. Cl. B32b 31/20
U.S. Cl. 156—235                                8 Claims This invention relates to a process for preparing fabric laminates. More particularly, this invention relates to a novel process for the preparation of fabric laminates possessing a high degree of breathability.

The prior art, as evidenced by U.S. Patent 2,826,509 to Donald V. Sarbach, teaches a method of making breathable fabric laminates by utilization of thin films of non-aqueous vulcanizable rubber compositions. Such films are made porous, and therefore breathable, by incorporating in the rubber composition a finely-divided solid material and then dissolving the solid material with a solvent which does not dissolve the rubber composition. Clearly, a system requiring the dissolution of a solid pore-forming agent is replete with multitudinous processing problems. In addition to the excessive amount of time required to bring into solution a solid pore-former, there is always the probability that not all of the pore-forming material has been completely dissipated. This residual solid material may impede the laminating process and, of course, the breathabilty of the resulting lamination. Presence of such solid particles in the fabric lamination would only detract from its value and utility. This would be particularly true where the fabric laminate is to be utilized in the production of wearing apparel.

Now in accordance with the present invention, thin elastomeric adhesive microporous films useful in forming breathable fabric laminates are produced by a continuous inexpensive process which eliminates both the finely-divided solid pore-forming material and the subsequent solvent extraction treatment. Moreover, the present process is extremely flexible in that it permits the formulator to vary the amount of breathability in a completely controllable and reproducible manner.

Fabric laminates produced in accordance with the method of the present invention exhibit not only outstanding breathability, but also excellent drape and hand qualities. Such laminates have proven to be valuable materials from which wearing apparel may be manufactured. In this respect, they provide superior wearing qualities while promoting breathability. By "breathability" is meant the ability of air or moisture vapor, such as that exuded from the body, to pass through the material without being significantly impeded.

Clearly, the breathability quality in fabrics is much sought after, not only with respect to wearing apparel but in other important areas, such as for example, furniture and automobile upholstery. The method of the present invention provides a significant and valuable advance in the art of producing useful breathable fabric laminates.

An object of this invention is to provide a method for preparing breathable fabric laminates.

Another object of this invention is to provide a method for preparing breathable fabric laminates having elastomeric qualities.

A further object of this invention is to provide a method for preparing breathable fabric laminates having excellent drape and hand.

Other objects and advantages of this invention will be apparent upon further reading of the disclosure hereinafter set forth.

Breathable fabric laminates are prepared in a simple economic process which comprises essentially six (6) individual but related stages.

(1) An elastomeric adhesive emulsion is frothed so as to increase by about 15 to 400% in volume, preferably 25 to 150%.

(2) The frothed emulsion is deposited on a release surface in sufficient thickness so as to give a porous film which when substantially dry has a thickness in the range of 0.001 to 0.010 inch, preferably 0.002 to 0.005 inch.

(3) The frother emulsion so deposited is substantially dried so as to reduce the moisture content to the range of about 0 to 15%, preferably 2 to 9%, based on the total weight of the film.

(4) After the film is dried to the designated moisture content, it is transferred to a backing fabric.

(5) Thereafter, a second or finishing fabric is laminated onto the backing fabric with an effective amount of adhesive film sandwiched between the two fabrics.

(6) Finally, the fabric laminate is subjected to heat and/or pressure so as to cure the elastomeric adhesive composition.

Adhesive compositions suitable for forming the novel laminations herein described comprise a latex of an elastomeric acrylic copolymer containing amido and/or methylolamido functionality along with an aminoplast and preferably a catalyst. Such compositions are set forth and described in U.S. Patents Nos. 3,033,811 and 3,157,562 and U.S. patent application Ser. No. 506,887 to James P. Shelley filed on Nov. 8, 1965. Said patents and application for patent are incorporated by reference thereto.

Depending upon the results desired, aesthetic or otherwise, in any particular application, the adhesive compositions previously described may be pigmented or dyed as required. Of course, in most cases, laminates are made with unpigmented or undyed adhesive films.

Porous films suitable for this invention are normally prepared by agitating the defined adhesive emulsions with a high speed stirrer or frothing mechanism in a manner so as to entrap air bubbles therein. This agitation is carried on until the volume of the composition is increased by about 15 to 400%. Where the volume of the emulsion is increased by more than 400%, the requisite thin films formed therefrom will be wanting in the necessary integrity, that is, there will be too many openings present for satisfactory use as a laminating material. Likewise, where an insufficient amount of air is entrapped in the adesive composition—less than about a 15% increase in volume—films formed therefrom will lack satisfactory breathability.

Thickening agents may be added to the adhesive emulsion so as to maintain the stability of the froth with regard to air bubble entrapment. However, addition of thickening agents will not always be necessary, since such additions will normally be dependent upon the consistency of the particular adhesive emulsion selected and the lapse of time between frothing and film forming.

After frothing, the adhesive latex is deposited on a surface which may consist of or be coated with release materials such as polytetrafluoroethylene, polyethylene, silicones and the like. Said forthed latex is laid down in a sufficient amount so as to have a film thickness in the range of 0.001 to 0.010 inch, preferably 0.002 to 0.005 inch when substantially dry. Substantially uniform thin films may be deposited by means of a knife spreader, roller coater, etc. The particular means selected for depositing the frothed film is not critical to nor forms any part of this invention.

It should be noted that the films formed according to the novel method of this invention, both continuous and discontinuous, are not foams but porous films. That is, the film comprises a larger number of minute holes or openings per any given area and not entrapped air bubbles as would be found in a true foam.

After deposition on the release surface of the adhesive composition, all but about 0 to 15% of the moisture content is removed. Various drying means such as ovens, hot air blowers, infrared lights and the like may be employed to achieve the required moisture level. A drying oven with a temperature range of 110° to 220° F. has proven to be particularly satisfactory. Depending upon the temperature and type of drying means, a time interval in the range of one second to twenty minutes will provide sufficient exposure of the porous film for the required removal of moisture without prematurely curing the film. Generally, as the temperature of the dryer is increased, the shorter the length of time required for moisture removal. While the particular temperature and time required for substantial drying of any selected adhesive film will vary, one skilled in the art would be able to make such determinations without difficulty.

Preferably, moisture removal will be effected at the lower temperature ranges since this will enable the film to have a longer effective shelf life. This phenomenon is due to the fact that the adhesive compositions employed herein are heat-settable, that is, upon heating, the components of the composition react to form a cross-linked insoluble product. Therefore, it is necessary to keep the film from reaching this cross-linked state until complete cure is desired which, of course, is usually after formation of the fabric laminate.

Conveyance of the film onto a selected backing fabric takes place after the film is dried to the acceptable moisture content range of 0 to 15%, based on the total weight of the film. When the breathable film is maintained at a temperature in the range of 140° to 200° F., transference is more easily achieved. Therefore, such conveyance of the film should take place immediately after moisture removal or the film should be exposed to heating means at the point of transfer. Of course, in a continuous laminating process it would be preferable and most economical to transfer the film as soon as possible after drying along with exposure to heating means.

Immediately after transfer of the film from the release surface onto a backing fabric, a finish fabric may be superposed over the backing fabric with the breathable film sandwiched between the two fabrics. Generally, it is preferable to superpose the finish fabric shortly after transfer of the film from the release surface onto the backing fabric. However, the backing fabric with the breathable film thereon may be stored in that condition where dictated by the exigencies of the situation. Normally, where the backing fabric and breathable film is so stored, a release paper is interleaved therein.

It should be noted at this point that in most situations the adhesive film will be initially transferred onto the backing fabric. However, this is not to be construed as a limitation of this invention. In many situations the breathable adhesive film will be first conveyed from the release surface onto the finish fabric and only thereafter will the backing fabric be superposed over the finish fabric with the adhesive film sandwiched between.

Curing of the final laminate takes place where the components are subjected to a heating means having a temperature in the range of about 210° to 500° F. Usually, complete cure can be obtained in as short a time as one second at a temperature of about 500° F. and as long as thirty minutes at a temperature of about 210° F. It should be noted that the temperature range of 210° to 500° F. is that of the heating menas and not that of the film units or laminate being cured.

The application of pressure in conjunction with the heating will generally shorten the time required for a complete cure. Economical production methods will ordinarily require curing at the higher temperature ranges and shorter times in concurrence with the application of pressure.

Various mechanical means may be utilized to produce breathable fabric laminates in accordance with this invention. An apparatus such as described and claimed in U.S. patent application Ser. No. 500,904 to Michael Storti filed on Oct. 22, 1965, depicts an excellent device which would lend itself very well for large scale economic production of breathable fabric laminates. Said patent application to Storti is incorporated herein by reference thereto. While various means or devices may be employed according to the method of this invention, all will generally require a high-speed stirring or frothing mechanism. Many such frothing means are commercially available and any individual device or combination thereof may be employed in this invention.

Generally, any fabric suitable for lamination may be used in accordance with the method of this invention.

Textiles made from fibers such as nylon, cotton, acetate, rayon, polyester, spandex, and acrylic fiber in addition to the non-woven fabrics are typical of those employed in this invention. While a good many laminates will involve fabrics of a comparatively tight weave, loosely woven fabrics can also be utilized as either finishing or backing fabrics. Because of the oustanding elastomeric qualities of the adhesive films utilized in this invention, they are particularly valuable in fashioning breathable laminates from stretch fabrics.

This invention makes possible te breathable lamination of dissimilar fabrics in addition to those of the same textile make-up. Laminates may consist of any combination of textiles, such as, for example, the following: cotton-rayon, cotton-cotton, nylon-cotton, nylon-nylon, acetate-acrylic fiber, spandex-nylon, etc. Nonwoven fabrics may be laminated to woven or other nonwoven fabrics. Likewise, knits may be laminated to woven, nonwoven, other knit fabrics and the like.

Selection of individual fabrics to constitute the make-up of any laminate may rest on a broad spectrum of reasons, such as, cost, warmth, strength, wearability, elastomeric ability, asesthetic value, availability, etc. For example, where a low cost laminate having aesthetic appeal and breathability is desired, a relatively inexpensive lower-quality backing material may be used in conjunction with a higher-quality finishing fabric. Likewise, a coarse material may be laminated to a finish fabric having good drape and hand where only one side of the laminate is exposed. In a similar manner, a laminate may be made from a fabric with maximum softness for use against the skin and the outer fabric may be selected for warmth, durability, aesthetic appeal and the like. Obviously, innumerable uses are evident throughout the spectrum of textile utilization for breathable laminates produced in accordance with this novel invention.

Either the backing or finishing fabric used in the method of this invention may consist in itself of a breathable fabric lamine. That is, multilaminations are possible and may be quite desirable in certain applications. For example, a reversible garment may be made by laminating sheer fabrics on both sides of a substantial backing fabric. The design and/or colors of the decorative films may be differentiated so as to result in a garment having intensified utility and aesthetic appeal. Of course, a lamination wherein the backing and/or finishing fabric consists of another fabric laminate would usually tend to be less breathable than a laminate made up of nonlaminated backing and/or finishing fabrics. However, in certain applications this multilamination may be most desirable for various reasons.

Laminates prepared in accordance with the economical method of this invention have exhibited in addition to breathability, excellent drape, hand, peel strength, dry cleanability, and machine washability.

The following examples are offered by way of illustration and not by way of limitation. Unless otherwise specified, all parts are by weight.

EXAMPLES

A 45% solids aqueous latex was prepared by copolymerizing 86 parts of ethyl acrylate, 10 parts of acrylonitrile, 2 parts of acrylamide, and 2 parts of methylolacrylamide in an aqueous dispersion using a free radical catalyst. An elastomeric adhesive emulsion suitable for frothing and film forming in accordance with this invention was obtained by combining 100 parts of the latex described above with 7 parts of a 70% solids methylated melamineformaldehyde condensate, 1.25 parts of a 28% solution of ammonium hydroxide, 0.44 part of a 25% solution of ammonia thiocyanate and 18.75 parts of a 4% solution of methyl cellulose. The resulting 46% solids emulsion was mechanically frothed so as to increase in volume by about 50%. After frothing, a continuous film of emulsion was deposited on release paper and substantially dried so as to bring the moisture content to about 4%, based on the total weight of the film. After drying of the film, it is laminated between two 15 denier nylon tricot fabrics. For comparison, a laminate of the same nylon fabrics was prepared as described above, except that the elastomeric emulsion was not frothed prior to film forming.

After curing, both the frothed and non-frothed laminates were subjected to various tests, the results of which are given in Table I. Each laminate was observed for air permeability, that is, the number of seconds required for 100 cc. of air to pass through the laminate. Further, each laminate was observed for moisture vapor transmission (MVT); namely, the number of milligrams of water which will pass through one square centimeter of laminate in 24 hours at 70° F. at a relative humidity of 65%. A moisture vapor transmission below 70 is not considered breathable.

TABLE.—15 DENIER NYLON LAMINATES

| | Air permeability (sec.) | MVT (mgs.) |
|---|---|---|
| Non-frothed | 93 | 22 |
| Frothed | <1 | 127 |

As indicated in the above table, the frothed laminate evidenced much better air permeability and moisture vapor transmission than the non-frothed laminate. In addition, both laminates were inspected for hand qualities and in this respect, the frothed laminate had a much softer feel than the more rigid non-frothed laminate. Peel strength of the frothed laminate was equivalent to that of the non-frothed. No puckering or delamination was observed after several dry cleanings and machine washings.

In a similar manner, two 15-denier nylon tricot fabrics were laminated using frothed elastomeric emulsions which were pigmented white or black. Laminates thus obtained exhibited properties which corresponded to the laminates prepared from frothed unpigmented emulsions as described above. Said pigmented laminates were characterized by a soft natural hand, pleasing appearance, excellent drape, and a peel strength exceeding general commercial requirements.

Similarly, fabric laminates were prepared from discontinuous films of frothed emulsion using the following textile combinations:

(1) 15-denier nylon tricot/15-denier nylon tricot
(2) 40-denier nylon tricot/15-denier nylon tricot
(3) 15-denier nylon tricot/polyester fiberfil
(4) 55-denier nylon tricot/70-denier circular knit cotton All of these laminates also exhibited such characteristics as good hand, drape, peel strength, dry cleanability, and machine washability.

I claim:
1. A method of preparing fabric laminates which comprises:
 (a) frothing of an elastomeric adhesive emulsion so as to increase in volume by about 15 to 400%,
 (b) depositing the frothed emulsion in sufficient thickness on a release surface so as to give a porous film which when substantially dried has a thickness in the range of 0.001 to 0.010 inch,
 (c) drying said frothed emulsion so as to reduce the moisture content to the range of 0 to 15% based on the total weight of the porous film,
 (d) transferring the substantially dried porous film to a backing fabric,
 (e) laminating a finishing fabric onto the backing fabric with an effective amount of porous adhesive film sandwiched between the two fabrics, and
 (f) curing the laminate.
2. A method according to claim 1 wherein the elastomeric adhesive emulsion is frothed so as to increase by about 25 to 150% in volume.
3. A method according to claim 1 wherein the frothed elastomeric adhesive emulsion is deposited on a release surface in sufficient thickness so as to give a dry film with a thickness in the range of 0.002 to 0.005 inch.
4. A method according to claim 1 wherein the moisture content range is reduced to the range of 2 to 9% based on the total weight of the porous film.
5. A method according to claim 1 wherein the laminate is cured at a temperature in the range of 210° to 500° F.
6. A method according to claim 1 wherein the elastomeric adhesive emulsion is a latex of an acrylic copolymer containing amido and/or methylolamido functionality.
7. A method according to claim 1 wherein the porous film is continuous.
8. A method according to claim 1 wherein the porous film is discontinuous.

References Cited

UNITED STATES PATENTS 3,383,263   5/1968   Storti _____ 156—235

EARL M. BERGERT, *Primary Examiner.*

M. L. KATZ, *Assistant Examiner.*

U.S. Cl. X.R.

156—246; 161—97